US012475392B2

United States Patent
Zhang et al.

(10) Patent No.: US 12,475,392 B2
(45) Date of Patent: Nov. 18, 2025

(54) AUXILIARY DECISION-MAKING METHOD FOR URBAN SUBWAY WATERLOGGING RISK DISPOSAL BASED ON BAYESIAN NETWORK

(71) Applicant: China National Institute of Standardization, Beijing (CN)

(72) Inventors: Chao Zhang, Beijing (CN); Shuai Huang, Beijing (CN); Tingxin Qin, Beijing (CN); Xiangcheng Meng, Beijing (CN); Wan Wang, Beijing (CN); Fengjiao Xu, Beijing (CN); Qian Zhou, Beijing (CN); Ying Qu, Beijing (CN); Dehua Guo, Beijing (CN)

(73) Assignee: China National Institute of Standardization, Beijing (CN)

( * ) Notice: Subject to any disclaimer, the term of this patent is extended or adjusted under 35 U.S.C. 154(b) by 0 days.

(21) Appl. No.: 19/093,219

(22) Filed: Mar. 27, 2025

(65) Prior Publication Data

US 2025/0328789 A1    Oct. 23, 2025

(30) Foreign Application Priority Data

Apr. 19, 2024  (CN) .......................... 202410476717.7

(51) Int. Cl.
*G06N 7/01* (2023.01)
(52) U.S. Cl.
CPC ..................... *G06N 7/01* (2023.01)
(58) Field of Classification Search
CPC ....................................................... G06N 7/01
See application file for complete search history.

(56) References Cited

U.S. PATENT DOCUMENTS

| 12,056,427 B1* | 8/2024 | Mei | G06F 30/20 |
|---|---|---|---|
| 2019/0222595 A1* | 7/2019 | Giani | G06F 18/295 |

(Continued)

FOREIGN PATENT DOCUMENTS

| CN | 112069726 A | 12/2020 |
|---|---|---|
| CN | 114399204 A | 4/2022 |
| CN | 115471078 A | 12/2022 |

OTHER PUBLICATIONS

Multi-Source Data Fusion and Hydrodynamics for Urban Waterlogging Risk Identification Zhang et al. (Year: 2023).*

(Continued)

*Primary Examiner* — Viker A Lamardo
*Assistant Examiner* — Ababacar Seck (57) ABSTRACT

Disclosed are an auxiliary decision-making method and system for urban subway waterlogging risk disposal based on a Bayesian network. The method includes: acquiring waterlogging data and basic data of a target city subway, preprocessing the waterlogging data, obtaining first evaluation data and second evaluation data from the preprocessed waterlogging data, performing risk assessment on the first evaluation data and the second evaluation data according to risk degrees to obtain a risk value, adjusting the risk value according to the monitoring data to determine a risk degree, and constructing an auxiliary decision-making model for waterlogging risk disposal according to the risk level to optimize the auxiliary decision-making for waterlogging risk disposal. The method not only can improve the accuracy of auxiliary decision-making for urban subway waterlogging risk disposal, but also has good interpretability, and can be directly applied to the auxiliary decision-making system for urban subway waterlogging risk disposal.

4 Claims, 2 Drawing Sheets

(56) References Cited

U.S. PATENT DOCUMENTS

| | | | | |
|---|---|---|---|---|
| 2023/0052633 A1* | 2/2023 | Kim | ............... | G01W 1/14 |
| 2023/0084910 A1* | 3/2023 | Wang | ............... | G06F 18/217 |
| | | | | 706/15 |
| 2023/0195979 A1* | 6/2023 | Fang | ............... | G06F 30/20 |
| | | | | 703/9 |

OTHER PUBLICATIONS

Urban agglomeration waterlogging hazard exposure assessment based on an integrated Naive Bayes classifier and complex network analysis Wang et al. (Year: 2023).*

A Method for Prediction of Waterlogging Economic Losses in a Subway Station Project Wu et al. (Year: 2021).*

Observations and Forecasts of Urban Transportation Meteorology in China: A Review Zhu et al. (Year: 2022).*

Assessment of vulnerability to waterlogging in subway stations using integrated EWM-TOPSIS Xiang et al. (Year: 2023).*

Risk Assessment of Rainstorm Waterlogging on Subway in Central Urban Area of Shanghai, China Based on Scenario Simulation Zhang et al. (Year: 2011).*

Research on the evaluation of the resilience of subway station projects to waterlogging disasters based on the projection pursuit model Liu et al. (Year: 2020).*

Risk Analysis of Urban Waterlogging Disaster based on Large Data Simulation (Year: 2017).*

* cited by examiner

AUXILIARY DECISION-MAKING METHOD FOR URBAN SUBWAY WATERLOGGING RISK DISPOSAL BASED ON BAYESIAN NETWORK

CROSS-REFERENCE TO RELATED APPLICATION

This application claims priority of Chinese Patent Application No. 202410476717.7, filed on Apr. 19, 2024, the entire contents of which are incorporated herein by reference.

TECHNICAL FIELD

The present disclosure relates to the field of decision-making, and in particular to an auxiliary decision-making method for urban subway waterlogging risk disposal based on a Bayesian network.

BACKGROUND

Traditional methods for predicting subway waterlogging risks primarily rely on historical data and expert experience, and prediction accuracy based on the methods is limited by data incompleteness and subjective judgment of experts. In recent years, rapid advancement of big data and artificial intelligence technology has offered new solutions for predicting subway waterlogging risks. The Bayesian network, as a powerful uncertainty reasoning tool, can be used to probabilistically characterize inter-factor relationships in comprehensive consideration of multiple influencing factors, thereby having broad application prospects in the field of risk prediction.

Based on the above background, the present disclosure provides an auxiliary decision-making method for urban subway waterlogging risk disposal based on a Bayesian network. The method holistically integrates meteorology, geology, drainage system and other factors, and enables to achieve accurate prediction and timely disposal of subway waterlogging risks by constructing a Bayesian network model. The method not only enhances prediction accuracy but also provides scientific and effective decision-making support for subway operation management authorities.

SUMMARY

An objective of the present disclosure is to provide an auxiliary decision-making method for urban subway waterlogging risk disposal based on a Bayesian network.

To achieve the above objective, the present disclosure adopts the following technical solution:

In a first aspect, the method of the present disclosure includes the following steps:

acquiring waterlogging data and basic data of a target city subway, and preprocessing the waterlogging data, where the waterlogging data includes historical waterlogging data, meteorological data, and monitoring data;

obtaining first evaluation data and second evaluation data from the preprocessed waterlogging data, where the first evaluation data characterizes a predicted water flow value of the target city subway, the second evaluation data characterizes an available drainage capacity of the target city subway, the predicted water flow value is a water flow rate predicted based on the monitoring data and the meteorological data, and the drainage capacity is an available water discharge volume obtained based on the basic data and the monitoring data;

performing risk assessment on the first evaluation data and the second evaluation data according to risk degrees to obtain a risk value, and adjusting the risk value according to the monitoring data to determine a risk degree; and constructing an auxiliary decision-making model for waterlogging risk disposal according to the risk degree to optimize the auxiliary decision-making for waterlogging risk disposal.

Further, a method for predicting a water flow rate based on the monitoring data and the meteorological data includes inputting the monitoring data and the meteorological data into a water flow prediction model to obtain a predicted rate of water flow entering the subway, where the water flow prediction model is constructed by using an autoregressive algorithm and a long-short term memory neural network algorithm.

Further, a method for predicting an available water discharge volume based on the basic data and the monitoring data includes:

using a drainage setting from the basic data as a reference standard to obtain a difference between an initial water volume of a drainage channel and a terminal water volume of the drainage channel from the monitoring data;

when the initial water volume of the drainage channel indicated in the monitoring data is greater than or equal to the reference standard, and when the difference is less than 10%, taking the reference standard of the channel as a water discharge volume of the current drainage pipe, otherwise taking the terminal water volume of the drainage channel as a water discharge volume of the current drainage pipe; and when the initial water volume of the drainage channel indicated in the monitoring data is lower than the reference standard, and when the difference is less than 13.1%, taking the reference standard of the channel as a water discharge volume of the current drainage pipe; when the difference is between 13.1% and 100%, taking the reference standard of the channel minus the difference as a water discharge volume of the current drainage pipe; and when the difference is 100%, taking 0 as a water discharge volume of the current drainage pipe.

Further, a method for performing risk assessment on the first evaluation data and the second evaluation data according to risk degrees includes:

classifying subway waterlogging attacks into three stages of early warning preparation, initial waterlogging, and severe waterlogging respectively, constructing an attack state matrix according to risk factors of subway waterlogging, and calculating a risk value with risk factors as nodes:

$$\mathcal{V}_w = \frac{\psi_1 a_w + \psi_2 b_w + \psi_3 c_w + \psi_4 d_w}{m}$$

where $a_w$ is a hazard degree of a node w, $b_w$ is an attack result of the node w, $c_w$ is an attack stage of the node w, $d_w$ is an attack state of the node w, $m$ is a sum of hazard degrees, attack results, attack stages and attack states, and weights thereof are $\psi_1$, $\psi_2$, $\psi_3$, and $\psi_4$ respectively;

determining a direction of directed edge according to causal relationships between risk factors, and calculating a weight of a directed edge of a node:

$$\mathcal{D}_{wy} = \sum_{i=1}^{N^*} \frac{\mathcal{V}_w^i Q_{wy}^i a_{wi}}{a_{wi,max} + z}$$

where $N^*$ is a total number of attack states, $a_{wi,max}$ is a maximum hazard degree of the node w in an attack state i, $$\mathcal{V}_w^i$$

is a risk value of the node w in the attack state i, $$Q_{wy}^i$$

is a probability that a node y is in the attack state i after attack by the node w, $a_{wi}$ is a hazard degree of the node w in the attack state i, z is an attack constant, and $\mathcal{D}_{wy}$ is a risk expectation that the node w attacks the node y;

constructing a directed weighted network according to directional risk factors and calculating an average probability of path-compromised nodes:

$$\overline{\mathcal{Q}}_w = \sum_{\ell=1}^n \frac{Q_{w\ell}}{n}$$

where $n$ is the number of other nodes compromised from the node w, $\ell$ is a path for compromising other nodes from the node w, $\overline{\mathcal{Q}}_w$ is an average probability of compromising other nodes from the node w, and $Q_{w\ell}$ is a probability of compromising other nodes from the mode w through a $\ell^{th}$ path;

calculating an average probability of being compromised:

$$\overline{\mathcal{P}}_w = \sum_{\ell_w}^{n_1} \frac{\mathcal{K}_{\ell w}}{n_1}$$

where $\mathcal{K}_{\ell w}$ is a probability of compromising the node w through the $\ell^{th}$ path, $n_1$ is the number of possible paths where the node w is compromised, and $\overline{\mathcal{P}}_w$ is an average probability of compromising the node i;

constructing a weighted directed graph based on the directed weighted network and calculating an importance index of node:

$$\varepsilon_w = \vartheta_1 \left( e^{\log_{10}(1+S_{ot}(w))} + e^{\log_{10}(1+S_{in}(w))} \right) \log_{10}(1 + S_{ot}(w)) + \vartheta_2 \log_{10}\left[ (1 + S_{in}(w))\left(1 + e^{-\nu \overline{\mathcal{P}}_w}\right) \right]^{\frac{1}{3}}$$

where $\varepsilon_w$ is an importance index of the node w, $\vartheta_1$ is a first balance factor, $\vartheta_2$ is a second balance factor, e is a natural constant, $S_{ot}(w)$ is a weight of the node w in sending connections, $S_{in}(w)$ is a weight of the node w in receiving connections, and u is a compromise coefficient;

calculating a weighted risk expectation of node:

$$\mathcal{A}_w = \lambda \sum_{i=1}^{N^*} \frac{\mathcal{V}_w^i R_w^i a_{iw}}{a_{iw,max} + z}$$

$\mathcal{A}_w$ is a weighted risk expectation of the node w, $$R_w^i$$

is a probability that the node w is in the attack state i, $\lambda$ is a weighting factor, and a risk value of the node is calculated as follows:

$$\mathcal{T}_w = \begin{cases} \frac{\varphi_1 \mathcal{A}_w + \varphi_2 \varepsilon_w}{|\mathcal{A}_w| + |\varepsilon_w|}, & \mathcal{A}_w > 0 \\ 0, & \mathcal{A}_w = 0 \end{cases}$$

where $\varphi_1$ is a first balance coefficient, $\varphi_2$ is a second balance coefficient, and $\mathcal{T}_w$ is a risk value of the node w.

Further, a method for adjusting the risk value according to the monitoring data to determine a risk degree includes:

calculating risk significance of monitoring data:

$$\hbar_j = \frac{\ln\left[ \sum_{j=1}^k \mathcal{U}_j |\mathcal{H}_j - \mathcal{S}_{i,bf}| + \chi_j \right]}{|\mathcal{S}_{i,bf}|}$$

where $\hbar_j$ is risk significance of $j^{th}$ monitoring data k is a total number of the $j^{th}$ monitoring data, $\mathcal{u}_j$ is a contribution degree of the $j^{th}$ monitoring data, $\mathcal{H}$ is a risk tolerance of the $j^{th}$ monitoring data, $\mathcal{S}_{i,bf}$ is a risk damage degree caused by a previous rainfall scenario indicated in the $j^{th}$ monitoring data, and $\chi_j$ is an intensity factor of the $j^{th}$ monitoring data;

integrating monitoring data with risk significance of greater than 0.362 into risk data, and calculating a risk degree according to the risk data:

$$U_c = \frac{1}{k} e^{-\ln\left(\sum_{j=1}^k \hbar_{cj} |f_{cj} - f_j^*| + \zeta_c\right)} \mathcal{T}_c$$

$U_c$ is a risk degree of a $c^{th}$ rainfall scenario, $f_{cj}$ is a value of $j^{th}$ risk data of the $c^{th}$ rainfall scenario, $f_j^*$ is a standard value of the $j^{th}$ risk data, $\hbar_{cj}$ is risk significance of the $j^{th}$ risk data of the $c^{th}$ rainfall scenario, $\zeta_c$ is an optimization factor of the $c^{th}$ rainfall scenario, k is a total number of the $j^{th}$ risk data of the $c^{th}$ rainfall scenario, and $\mathcal{T}_c$ is a risk value of the $c^{th}$ rainfall scenario.

Further, a method for constructing an auxiliary decision-making model for waterlogging risk disposal according to the risk degree includes:

taking the risk degree as a criterion of decision-making through the auxiliary decision-making model for waterlogging risk disposal:

when the risk degree is less than 0.29, the risk level is classified as Level 1; when the risk degree is greater than 0.29 but less than 0.53, the risk level is classified as Level 2; when the risk degree is greater than 0.53 but less than 0.71, the risk level is classified as Level 3; when the risk degree is greater than 0.71 but less than 0.89, the risk level is classified as Level 4; and when the risk degree is greater than 0.89 but less than 1, the risk level is classified as a special level;

the auxiliary decision-making model for waterlogging risk disposal includes an association rule mining algorithm, a Bayesian network algorithm, a long short-term memory network algorithm, and a fuzzy evaluation algorithm;

the association rule mining algorithm selects critical data based on correlation of waterlogging data;

the Bayesian network algorithm constructs a basic Bayesian network structure according to the critical data; risk factors are defined as nodes of the Bayesian network; a probability value is assigned to the state of each node; and general risk factor nodes, decision-making nodes and utility nodes are configured to obtain a first risk degree;

the long short-term memory network algorithm predicts a second risk degree according to temporal characteristics of the critical data; and the fuzzy evaluation algorithm fuses the first risk degree and the second risk degree to obtain a risk degree.

Further, a method for optimizing the auxiliary decision-making for waterlogging risk disposal includes:

randomly generating a plurality of search agents and calculating positions of the search agents:

$$\hat{u}_{a,s} = \mathcal{U}_{a,s} + \frac{r}{r+1}[\mathcal{U}_{p,s} - (1+r)\mathcal{U}_{a,s}] + \text{sign}(\hat{C}_a - \hat{C}_p)$$

where $\hat{\mathcal{U}}_{a,s}$ represents an updated position of an $a^{th}$ search agent in an $s^{th}$ dimension, $\mathcal{U}_{a,s}$ represents a position of the $a^{th}$ search agent in the $s^{th}$ dimension, r is a random number, sign(•) is a sign function, $C_a$ is an objective function value of the $a^{th}$ search agent, $\mathcal{U}_{p,s}$ represents a position of a $p^{th}$ search agent in the $s^{th}$ dimension, and $C_p$ is an objective function value of the $p^{th}$ search agent;

calculating an updated position and mutation individual of search agent:

$$\mathcal{U}_1 = \begin{cases} \hat{u}_{a,s}, & \hat{C}_a < \hat{C}_a \\ \mathcal{U}_a, & \text{others} \end{cases}$$

$$\mathcal{G}_{a,t} = \mathcal{U}_{r_1,t} + \text{rd}(\mathcal{U}_{r_2,t} - \mathcal{U}_{r_3,t}) + \text{rd}(\mathcal{U}_{r_4,t} - \mathcal{U}_{r_5,t})$$

$\hat{C}_a$ represents an updated objective function value of the $a^{th}$ search agent, $\mathcal{U}_1$ represents a position of the search agent after first-stage update, random numbers are $r_1$, $r_2$, $r_3$, $r_4$ and $r_5$ respectively, rd(•) is a random number function, random individuals of a population during a $t^{th}$ iteration are denoted as $\mathcal{U}_{r_1,t}$, $\mathcal{U}_{r_2,t}$, $\mathcal{U}_{r_3,t}$, $\mathcal{U}_{r_4,t}$ and $\mathcal{U}_{r_5,t}$ respectively, and a mutation individual of the $a^{th}$ search agent of a population during the $t^{th}$ iteration is denoted as $\mathcal{G}_{a,t}$;

calculating a position of a moving search agent:

$$u^*_{a,s} = \mathcal{U}_{a,s} + \frac{r}{r+1}[\eta(\mathcal{U}_{b,s} - \mathcal{U}_{v,s}) + (1-\eta)(\mathcal{U}_{b,s} - 2\mathcal{U}_{v,s})] \cdot \text{sign}(\hat{C}_1 - \hat{C}_\kappa)$$

where $u^*_{a,s}$ represents a position of the $a^{th}$ search agent moving in the $s^{th}$ dimension, $\mathcal{U}_{b,s}$ represents a position of a $b^{th}$ search agent moving in the $s^{th}$ dimension, $\mathcal{U}_{v,s}$ represents a position of a $v^{th}$ search agent in the $s^{th}$ dimension, $C_1$ is an objective function value of a $1^{st}$ search agent, and an objective function value of a $\kappa^{th}$ search agent is $C_\kappa$;

calculating a scaling factor:

$$\eta_t = \eta_{min} + \frac{\eta_{max} - \eta_{min}}{1 + e^{-\beta\left(\frac{t_{max}-t}{t_{max}} - H\right)}}$$

where $\eta_t$ is a scaling factor of the $t^{th}$ iteration, $\eta_{max}$ is a maximum value of the scaling factor, $\eta_{min}$ is a minimum value of the scaling factor, $\beta$ is a control parameter, $t_{max}$ is a maximum number of iterations, H is a maximum linear coefficient, and a post-attack position of search agent is calculated as follows:

$$\mathcal{U}_2 = \begin{cases} u^*_{a,s}, & C^*_a < C \\ \mathcal{U}_a, & \text{others} \end{cases}$$

where $\mathcal{U}_2$ represents a position of the search agent after second-stage update, $C^*_a$ is an objective function value of the $a^{th}$ search agent moving, $C$ is an objective function value, and an updated mutation individual is calculated as follows:

$$\hat{\mathcal{G}}_{a,t_{max}} = \mathcal{U}_{r_6,t_{max}} + \chi(\mathcal{U}_{r_7,t_{max}} - \mathcal{U}_{r_8,t_{max}})$$

where random numbers are $r_6$, $r_7$ and $r_8$ respectively, $\hat{\mathcal{G}}_{a,t_{max}}$ represents an updated mutation individual of the $a^{th}$ search agent at the maximum number of iterations, $\mathcal{U}_{r_6,t_{max}}$ represents a position of search agent corresponding to the random number $r_6$ and the maximum number of iterations, $\mathcal{U}_{r_7,t_{max}}$ represents a position of search agent corresponding to the random number $r_7$ and the maximum number of iterations, $\mathcal{U}_{r_8,t_{max}}$ represents a position of search agent corresponding to the random number $r_8$ and the maximum number of iterations, and $\chi$ is a mutation coefficient.

In a second aspect, an electronic device is further provided in an example of the present disclosure, including: a processor; and a memory configured to store computer-executable instructions, where when the executable instructions are executed, the processor implements the method steps described in the first aspect.

In a third aspect, a computer-readable storage medium is further provided in an example of the present disclosure, the computer-readable storage medium stores one or more programs, and when the one or more programs are executed by an electronic device including a plurality of applications, the electronic device executes the method steps described in the first aspect.

The present disclosure features the following beneficial effects:

The present disclosure provides the auxiliary decision-making method and system for urban subway waterlogging risk disposal based on a Bayesian network. Compared with the prior art, the present disclosure has the following technical effects:

Through preprocessing, water flow prediction, available water discharge volume prediction, risk assessment, risk value adjustment, model construction and model optimization, the present disclosure improves the accuracy of auxiliary decision-making for urban subway waterlogging risk disposal, improves the precision of auxiliary decision-making for urban subway waterlogging risk disposal, and optimizes the auxiliary decision-making for urban subway waterlogging risk disposal, which can greatly save resources and improve work efficiency, realize intelligent auxiliary decision-making for urban subway waterlogging risk disposal, and achieve real-time risk correction on the auxiliary decision-making for urban subway waterlogging risk disposal. The present disclosure is of great significance to the auxiliary decision-making for urban subway waterlogging risk disposal, adapts to diverse standards of auxiliary decision-making for urban subway waterlogging risk disposal, and meets different needs of auxiliary decision-making for urban subway waterlogging risk disposal, thereby having certain universality.

DETAILED DESCRIPTIONS OF THE EMBODIMENTS

The present disclosure will be further described below in conjunction with specific examples, and illustrative examples and descriptions of the present disclosure are intended to explain the present disclosure, but are not intended to limit the present disclosure.

Figure 1:
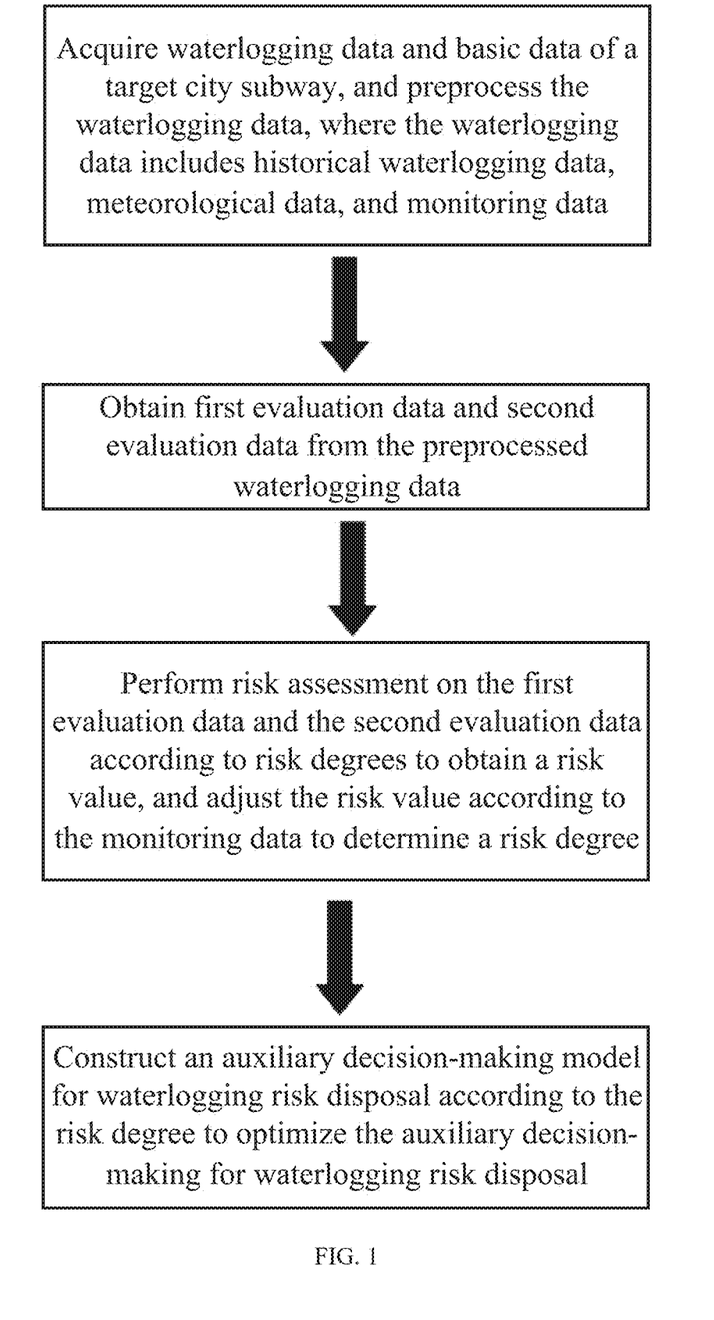
FIG. 1 is a flowchart of steps of an auxiliary decision-making method for urban subway waterlogging risk disposal based on a Bayesian network of the present disclosure.

An auxiliary decision-making method for urban subway waterlogging risk disposal based on a Bayesian network of the present disclosure includes the following steps:

As shown in FIG. 1, in this example, the following steps are included:
acquire waterlogging data and basic data of a target city subway, and preprocess the waterlogging data, where the waterlogging data includes historical waterlogging data, meteorological data, and monitoring data;
obtain first evaluation data and second evaluation data from the preprocessed waterlogging data, where the first evaluation data characterizes a predicted water flow value of the target city subway, the second evaluation data characterizes an available drainage capacity of the target city subway, the predicted water flow value is a water flow rate predicted based on the monitoring data and the meteorological data, and the drainage capacity is an available water discharge volume obtained based on the basic data and the monitoring data;
perform risk assessment on the first evaluation data and the second evaluation data according to risk degrees to obtain a risk value, and adjust the risk value according to the monitoring data to determine a risk degree; and
construct an auxiliary decision-making model for waterlogging risk disposal according to the risk degree to optimize the auxiliary decision-making for waterlogging risk disposal.

In this example, a method for predicting a water flow rate based on the monitoring data and the meteorological data includes inputting the monitoring data and the meteorological data into a water flow prediction model to obtain a predicted rate of water flow entering the subway, where the water flow prediction model is constructed by using an autoregressive algorithm and a long-short term memory neural network algorithm.

In this example, a method for predicting an available water discharge volume based on the basic data and the monitoring data includes:
use a drainage setting from the basic data as a reference standard to obtain a difference between an initial water volume of a drainage channel and a terminal water volume of the drainage channel from the monitoring data;
when the initial water volume of the drainage channel indicated in the monitoring data is greater than or equal to the reference standard, and when the difference is less than 10%, taking the reference standard of the channel as a water discharge volume of the current drainage pipe, otherwise taking the terminal water volume of the drainage channel as a water discharge volume of the current drainage pipe; and
when the initial water volume of the drainage channel indicated in the monitoring data is lower than the reference standard, and when the difference is less than 13.1%, taking the reference standard of the channel as a water discharge volume of the current drainage pipe; when the difference is between 13.1% and 100%, taking the reference standard of the channel minus the difference as a water discharge volume of the current drainage pipe; and when the difference is 100%, taking 0 as a water discharge volume of the current drainage pipe.

In this example, a method for performing risk assessment on the first evaluation data and the second evaluation data according to risk degrees includes:
classify subway waterlogging attacks into three stages of early warning preparation, initial waterlogging, and severe waterlogging respectively, construct an attack state matrix according to risk factors of subway waterlogging, and calculate a risk value with risk factors as nodes:

$$\mathcal{V}_w = \frac{\psi_1 a_w + \psi_2 \mathcal{b}_w + \psi_3 c_w + \psi_4 d_w}{m}$$

where $a_w$ is a hazard degree of a node w, $\mathcal{b}_w$ is an attack result of the node w, $c_w$ is an attack stage of the node w, $d_w$ is an attack state of the node w, $m$ is a sum of hazard degrees, attack results, attack stages and attack states, and weights thereof are $\psi_1$, $\psi_2$, $\psi_3$ and $\psi_4$ respectively;
determine a direction of directed edge according to causal relationships between risk factors, and calculate a weight of a directed edge of a node:

$$\mathcal{D}_{wy} = \sum_{i=1}^{N*} \frac{\mathcal{V}_w^i Q_{wy}^i a_{wi}}{a_{wi,max} + z}$$

where N* is a total number of attack states, $a_{wi,max}$ is a maximum hazard degree of the node w in an attack state i, $$\mathcal{V}_w^i$$

is a risk value of the node w in the attack state i, $$Q_{wy}^i$$

is a probability that a node y is in the attack state i after attack by the node w, $a_{wi}$ is a hazard degree of the node w in the attack state i, z is an attack constant, and $\mathcal{D}_{wy}$ is a risk expectation that the node w attacks the node y;

construct a directed weighted network according to directional risk factors and calculate an average probability of path-compromised nodes:

$$\bar{\mathcal{G}}_w = \sum_{\ell=1}^{n} \frac{Q_{w\ell}}{n}$$

where $n$ is the number of other nodes compromised from the node w, $\ell$ is a path for compromising other nodes from the node w, $\bar{\mathcal{G}}_w$ is an average probability of compromising other nodes from the node w, and $Q_{w\ell}$ is a probability of compromising other nodes from the mode w through a $\ell^{th}$ path;

calculate an average probability of being compromised:

$$\bar{\mathcal{P}}_w = \sum_{\ell_w}^{n_1} \frac{\mathcal{K}_{\ell_w}}{n_1}$$

where $\mathcal{K}_{\ell_w}$ is a probability of compromising the node w through the $\ell^{th}$ path, $n$ is the number of possible paths where the node w is compromised, and $\bar{\mathcal{P}}_w$ is an average probability of compromising the node i;

construct a weighted directed graph based on the directed weighted network and calculate an importance index of node:

$$\varepsilon_w = \vartheta_1 \left( e^{\log_{10}(1+S_{ot}(w))} + e^{\log_{10}(1+S_{in}(w))} \right) \log_{10}(1 + S_{ot}(w)) + $$
$$\vartheta_2 \log_{10}\left[(1 + S_{in}(w))\left(1 + e^{-v\bar{\mathcal{P}}_w}\right)\right]^{1/3}$$

where $\varepsilon_w$ is an importance index of the node w, $\vartheta_1$ is a first balance factor, $\vartheta_2$ is a second balance factor, e is a natural constant, $S_{ot}(w)$ is a weight of the node w in sending connections, $S_{in}(w)$ is a weight of the node w in receiving connections, and $\upsilon$ is a compromise coefficient;

calculate a weighted risk expectation of node:

$$\mathcal{A}_w = \lambda \sum_{i=1}^{N*} \frac{\mathcal{V}_w^i R_w^i a_{iw}}{a_{iw,max} + z}$$

$\mathcal{A}_w$ is a weighted risk expectation of the node w, $$R_w^i$$

is a probability that the node w is in the attack state i, $\lambda$ is a weighting factor, and a risk value of the node is calculated as follows:

$$\mathcal{T}_w = \begin{cases} \frac{\varphi_1 \mathcal{A}_w + \varphi_2 \varepsilon_w}{|\mathcal{A}_w| + |\varepsilon_w|}, & \mathcal{A}_w > 0 \\ 0, & \mathcal{A}_w = 0 \end{cases}$$

where $\varphi_1$ is a first balance coefficient, $\varphi_2$ is a second balance coefficient, and $\mathcal{T}_w$ is a risk value of the node w.

In this example, a method for adjusting the risk value according to the monitoring data to determine a risk degree includes:

calculate risk significance of monitoring data:

$$\hbar_j = \frac{\ln\left[\sum_{j=1}^{k} \mathcal{U}_j |\mathcal{H}_j - \mathcal{S}_{i,bf}| + \chi_j\right]}{|\mathcal{S}_{i,bf}|}$$

where $\hbar_j$ is risk significance of $j^{th}$ monitoring data, k is a total number of the $j^{th}$ monitoring data, $u_j$ is a contribution degree of the $j^{th}$ monitoring data, $\mathcal{H}_j$ is a risk tolerance of the $j^{th}$ monitoring data, $\mathcal{S}_{i,bf}$ is a risk damage degree caused by a previous rainfall scenario indicated in the $j^{th}$ monitoring data, and $\chi_j$ is an intensity factor of the $j^{th}$ monitoring data;

integrate monitoring data with risk significance of greater than 0.362 into risk data, and calculate a risk degree according to the risk data:

$$U_c = \frac{1}{k} e^{-\ln\left(\sum_{j=1}^{k} \hbar_{cj} |f_{cj} - f_j^*| + \zeta_c\right)} \mathcal{T}_c$$

$U_c$ is a risk degree of a $c^{th}$ rainfall scenario, $f_{cj}$ is a value of $j^{th}$ risk data of the $c^{th}$ rainfall scenario, $f_j^*$ is a standard value of the $j^{th}$ risk data, $\hbar_{cj}$ is risk significance of the $j^{th}$ risk data of the $c^{th}$ rainfall scenario, $\zeta_c$ is an optimization factor of the $c^{th}$ rainfall scenario, k is a total number of the $j^{th}$ risk data of the $c^{th}$ rainfall scenario, and $\mathcal{T}_c$ is a risk value of the $c^{th}$ rainfall scenario.

In this example, a method for constructing an auxiliary decision-making model for waterlogging risk disposal according to the risk degree includes:

take the risk degree as a criterion of decision-making through the auxiliary decision-making model for waterlogging risk disposal:

when the risk degree is less than 0.29, the risk level is classified as Level 1; when the risk degree is greater than 0.29 but less than 0.53, the risk level is classified as Level 2; when the risk degree is greater than 0.53 but less than 0.71, the risk level is classified as Level 3;

when the risk degree is greater than 0.71 but less than 0.89, the risk level is classified as Level 4; and when the risk degree is greater than 0.89 but less than 1, the risk level is classified as a special level;

the auxiliary decision-making model for waterlogging risk disposal includes an association rule mining algorithm, a Bayesian network algorithm, a long short-term memory network algorithm, and a fuzzy evaluation algorithm;

the association rule mining algorithm selects critical data based on correlation of waterlogging data;

the Bayesian network algorithm constructs a basic Bayesian network structure according to the critical data; risk factors are defined as nodes of the Bayesian network; a probability value is assigned to the state of each node; and general risk factor nodes, decision-making nodes and utility nodes are configured to obtain a first risk degree;

the long short-term memory network algorithm predicts a second risk degree according to temporal characteristics of the critical data; and the fuzzy evaluation algorithm fuses the first risk degree and the second risk degree to obtain a risk degree.

In this example, a method for optimizing the auxiliary decision-making for waterlogging risk disposal includes:

randomly generate a plurality of search agents and calculate positions of the search agents:

$$\acute{u}_{a,s} = \mathcal{U}_{a,s} + \frac{r}{r+1}\left[\mathcal{U}_{p,s} - (1+r)\mathcal{U}_{a,s}\right] + \text{sign}\left(\acute{C}_a - \acute{C}_p\right)$$

where $\acute{u}_{a,s}$ represents an updated position of an $a^{th}$ search agent in an $s^{th}$ dimension, $\mathcal{U}_{a,s}$ represents a position of the $a^{th}$ search agent in the $s^{th}$ dimension, r is a random number, sign(•) is a sign function, $\acute{C}_a$ is an objective function value of the $a^{th}$ search agent, $\mathcal{U}_{p,s}$ represents a position of a $p^{th}$ search agent in the $s^{th}$ dimension, and $\acute{C}_p$ is an objective function value of the $p^{th}$ search agent;

calculate an updated position and mutation individual of search agent:

$$\mathcal{U}_1 = \begin{cases} \acute{u}_{a,s}, & \acute{C}_a < \acute{C}_a \\ \mathcal{U}_a, & \text{others} \end{cases}$$

$$\mathcal{G}_{a,t} = \mathcal{U}_{r_1,t} + \text{rd}\left(\mathcal{U}_{r_2,t} - \mathcal{U}_{r_3,t}\right) + \text{rd}\left(\mathcal{U}_{r_4,t} - \mathcal{U}_{r_5,t}\right)$$

$\acute{C}_a$ represents an updated objective function value of the $a^{th}$ search agent, $\mathcal{U}_1$ represents a position of the search agent after first-stage update, random numbers are $r_1$, $r_2$, $r_3$, $r_4$ and $r_5$ respectively, rd(•) is a random number function, random individuals of a population during a $t^{th}$ iteration are denoted as $\mathcal{U}_{r_1,t}$, $\mathcal{U}_{r_2,t}$, $\mathcal{U}_{r_3,t}$, $\mathcal{U}_{r_4,t}$ and $\mathcal{U}_{r_5,t}$ respectively, and a mutation individual of the $a^{th}$ search agent of a population during the $t^{th}$ iteration is denoted as $\mathcal{G}_{a,t}$;

calculate a position of a moving search agent:

$$u^*_{a,s} =$$

$$\mathcal{U}_{a,s} + \frac{r}{r+1}\left[\eta(\mathcal{U}_{b,s} - \mathcal{U}_{v,s}) + (1-\eta)(\mathcal{U}_{b,s} - 2\mathcal{U}_{v,s})\right] \cdot \text{sign}\left(\acute{C}_1 - \acute{C}_\kappa\right)$$

where $$\mathcal{U}^*_{a,s}$$

represents a position of the $a^{th}$ search agent moving in the $s^{th}$ dimension, $\mathcal{U}_{b,s}$ represents a position of a $b^{th}$ search agent moving in the $s^{th}$ dimension, $\mathcal{U}_{v,s}$ represents a position of a $v^{th}$ search agent in the $s^{th}$ dimension, $\acute{C}_1$ is an objective function value of a $1^{st}$ search agent, and an objective function value of a $\kappa^{th}$ search agent is $\acute{C}_\kappa$;

calculate a scaling factor:

$$\eta_t = \eta_{min} + \frac{\eta_{max} - \eta_{min}}{1 + e^{-\beta\left(\frac{t_{max}-t}{t_{max}} - H\right)}}$$

where $\eta_t$ is a scaling factor of the $t^{th}$ iteration, $\eta_{max}$ is a maximum value of the scaling factor, $\eta_{min}$ is a minimum value of the scaling factor, $\beta$ is a control parameter, $t_{max}$ is a maximum number of iterations, H is a maximum linear coefficient, and a post-attack position of search agent is calculated as follows:

$$\mathcal{U}_2 = \begin{cases} u^*_{a,s}, & \acute{C}^*_a < \acute{C} \\ \mathcal{U}_a, & \text{others} \end{cases}$$

where $\mathcal{U}_2$ represents a position of the search agent after second-stage update, $\acute{C}^*_a$ is an objective function value of the $a^{th}$ search agent moving, $\acute{C}$ is an objective function value, and an updated mutation individual is calculated as follows:

$$\acute{\mathcal{G}}_{a,t_{max}} = \mathcal{U}_{r_6,t_{max}} + \chi(\mathcal{U}_{r_7,t_{max}} - \mathcal{U}_{r_8,t_{max}})$$

where random numbers are $r_6$, $r_7$ and $r_8$ respectively, $\acute{\mathcal{G}}_{a,t_{max}}$ represents an updated mutation individual of the $a^{th}$ search agent at the maximum number of iterations, $\mathcal{U}_{r_6,t_{max}}$ represents a position of search agent corresponding to the random number $r_6$ and the maximum number of iterations, $\mathcal{U}_{r_7,t_{max}}$ represents a position of search agent corresponding to the random number $r_7$ and the maximum number of iterations, $\mathcal{U}_{r_8,t_{max}}$ represents a position of search agent corresponding to the random number $r_8$ and the maximum number of iterations, and $\chi$ is a mutation coefficient.

Figure 2:
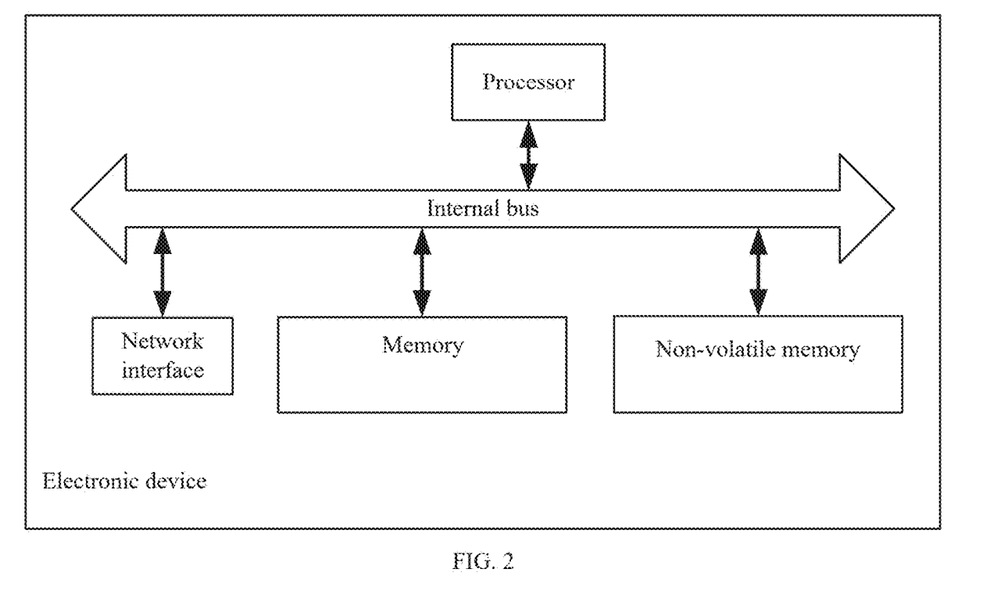
FIG. 2 is a structural schematic diagram of an electronic device in an example of the specification of the present disclosure.

FIG. 2 is a structural schematic diagram of an electronic device in an example of the present disclosure. With reference to FIG. 2, at the hardware level, the electronic device includes a processor, and optionally further includes an internal bus, a network interface, and a memory. The memory may include a volatile memory, such as a high-speed random access memory (RAM), and may also include a non-volatile memory, such as at least one disk memory and the like. Of course, the electronic device may also include hardware required for other services.

The processor, the network interface and the memory may be interconnected via an internal bus, and the internal bus may be an industry standard architecture (ISA) bus, a peripheral component interconnect (PCI) bus or an extended industry standard architecture (EISA) bus, and the like. The bus can be divided into an address bus, a data bus, a control bus, and the like. For the convenience of expression, only one bidirectional arrow is used in FIG. 2, but it does not mean that there is only one bus or one type of bus.

The memory is configured for storing programs. Specifically, the program may include a program code, and the program code includes a computer operation instruction. The memory may include a volatile memory and a non-volatile memory, and provides instructions and data to the processor.

The processor reads a corresponding computer program from the non-volatile memory into the memory and then executes same, and an auxiliary decision-making device for urban subway waterlogging risk disposal based on a Bayesian network is formed at the logical level. The processor executes the program stored in the memory and is specifically used to execute any of the above auxiliary decision-making methods for urban subway waterlogging risk disposal based on a Bayesian network.

The auxiliary decision-making method for urban subway waterlogging risk disposal based on Bayesian network disclosed in an example shown in FIG. 1 of the present application can be applied to the processor or implemented by the processor. The processor may be an integrated circuit chip with signal processing capabilities. In the implementation process, each step of the above method can be implemented by means of an integrated logic circuit of hardware in the processor or an instruction in the form of software. The above processor can be a general-purpose processor, including a central processing unit (CPU), a network processor (NP) and the like; and can also be a digital signal processor (DSP), an application-specific integrated circuit (ASIC), a field-programmable gate array (FPGA), or any other programmable logic device, a discrete gate or a transistor logic device, or a discrete hardware component, and the like. The methods, steps and logic block diagrams disclosed in the examples of the present disclosure can be implemented or executed. The general-purpose processor can be a microprocessor, or the processor can also be any conventional processor. The steps of the method disclosed in the examples of the present disclosure can be directly executed by a hardware decoding processor, or executed through a combination of hardware and software modules in the decoding processor. The software module can be located in a mature storage medium in the art such as a random access memory, flash memory, read-only memory, programmable read-only memory or electrically erasable programmable memory, register, and the like. The storage medium is located in the memory, and the processor reads information in the memory and implements the steps of the above method in combination with its hardware.

The electronic device can also execute the auxiliary decision-making method for urban subway waterlogging risk disposal based on a Bayesian network shown in FIG. 1, and realizes the functions of the examples shown in FIG. 1, and the examples of the present disclosure will not be described in detail herein.

In an example of the present disclosure, a computer-readable storage medium is further provided, the computer-readable storage medium stores one or more programs, the one or more programs include instructions, and when the instructions are executed by an electronic device including a plurality of applications, any of the above auxiliary decision-making methods for urban subway waterlogging risk disposal based on a Bayesian network is executed.

A person skilled in the art should understand that the examples of the present disclosure may be provided in the form of a method, a system or a computer program product. Therefore, the present disclosure may use a form of a complete hardware example, a complete software example or an example combining software and hardware. Moreover, the present disclosure may use a form of a computer program product that is implemented on one or more computer-usable storage media (including but not limited to a disk memory, a CD-ROM, an optical memory or the like) that include the computer-usable program code.

The present disclosure is described with reference to the flowcharts and/or block diagrams of the method, the apparatus (systems), and the computer program product according to the examples of the present disclosure. It should be understood that computer program instructions may be used to implement each procedure and/or each block in the flowcharts and/or the block diagrams and a combination of a procedure and/or a block in the flowcharts and/or the block diagrams. These computer program instructions may be provided to a general-purpose computer, a dedicated computer, an embedded processor or a processor of any other programmable data processing apparatus to generate a machine, so that the instructions executed by a computer or a processor of any other programmable data processing apparatus generate a device for implementing a specific function in one or more procedures in the flowcharts and/or in one or more blocks in the block diagrams.

These computer program instructions may also be stored in a computer-readable memory that can instruct the computer or any other programmable data processing apparatus to work in a specific manner, so that the instructions stored in the computer-readable memory generate manufactured products including an instruction device. The instruction device implements a specific function in one or more procedures in the flowcharts and/or in one or more blocks in the block diagrams.

These computer program instructions may also be loaded onto a computer or any other programmable data processing apparatus, so that a series of operations and steps are performed on the computer or any other programmable apparatus, so as to generate computer-implemented processing. Therefore, the instructions executed on the computer or any other programmable apparatus provide steps for implementing a specific function in one or more processes in the flowcharts and/or in one or more blocks in the block diagrams.

In a typical configuration, a computing device includes one or more central processing units (CPUs), input/output interfaces, network interfaces, and memories.

The memory may include a non-permanent memory in a computer-readable medium, a random access memory (RAM) and/or a non-volatile memory and the like, such as a read-only memory (ROM) or a flash RAM. The memory is an example of a computer-readable medium.

Computer-readable media include permanent and non-permanent, removable and non-removable media that can be used to store information by any method or technology. Information may be computer-readable instructions, data structures, program modules, or other data. Examples of computer storage media include, but are not limited to, a phase change random access memory (PRAM), a static random access memory (SRAM), a dynamic random access memory (DRAM), any other type of random access memory (RAM), read-only memory (ROM), electrically erasable programmable read-only memory (EEPROM), flash memory or other memory technology, compact disk read-only memory (CD-ROM), digital versatile disk (DVD) or any other optical storage device, magnetic cassette, magnetic disk storage device or any other magnetic storage device, or any other non-transmission medium that can be used to store information accessible to a computing device. As defined herein, the computer-readable medium excludes transitory media, such as modulated data signals and carrier waves.

It should also be noted that the terms "comprising", "including" or any other variants are intended to cover the non-exclusive including, thereby making that the process, method, merchandise or apparatus comprising a series of elements comprise not only those elements but also other elements that are not listed explicitly or the inherent elements to the process, method, merchandise or apparatus. Without more restrictions, the elements defined by the sentence "including a . . . " do not exclude the existence of other identical elements in the process, method, merchandise, or device including the elements.

A person skilled in the art should understand that the embodiments of the present application may be provided in the form of a method, a system or a computer program product. Therefore, the present application may use a form of a complete hardware embodiment, a complete software embodiment or an embodiment combining software and hardware. Moreover, the present disclosure may use a form of a computer program product that is implemented on one or more computer-usable storage media (including but not limited to a disk memory, a CD-ROM, an optical memory or the like) that include the computer-usable program code.

The foregoing descriptions are merely exemplary examples of the present disclosure, but are not intended to limit the present disclosure. Any modification, equivalent replacement or improvement derived within the spirit and principle of the present disclosure shall all fall within the protection scope of the present disclosure.

The invention claimed is:

1. An auxiliary decision-making method for urban subway waterlogging risk disposal based on a Bayesian network, comprising the following steps performed by one or more processors:

acquiring waterlogging data and basic data of a target city subway stored in a memory, and preprocessing the waterlogging data in the memory, wherein the waterlogging data comprises historical waterlogging data, meteorological data, and monitoring data;

in the memory, obtaining first evaluation data and second evaluation data from the preprocessed waterlogging data, wherein the first evaluation data characterizes a predicted water flow value of the target city subway, the second evaluation data characterizes an available drainage capacity of the target city subway, the predicted water flow value is a water flow rate predicted based on the monitoring data and the meteorological data, and the drainage capacity is an available water discharge volume obtained based on the basic data and the monitoring data;

in the memory, performing risk assessment on the first evaluation data and the second evaluation data according to risk degrees to obtain a risk value, comprising:

classifying subway waterlogging attacks into three stages of early warning preparation, initial waterlogging, and severe waterlogging respectively, constructing an attack state matrix according to risk factors of subway waterlogging, and calculating a risk value with risk factors as nodes:

$$\mathcal{V}_w = \frac{\psi_1 a_w + \psi_2 \beta_w + \psi_3 c_w + \psi_4 d_w}{m}$$

wherein $\alpha_w$ is a hazard degree of a node w, $\mathcal{b}_w$ is an attack result of the node w, $c_w$ is an attack stage of the node w, $d_w$ is an attack state of the node w, $m$ is a sum of hazard degrees, attack results, attack stages and attack states, and weights thereof are $\psi_1$, $\psi_2$, $\psi_3$ and $\psi_4$ respectively;

determining a direction of directed edge according to causal relationships between risk factors, calculating a weight of a directed edge of a node:

$$\mathcal{D}_{wy} = \sum_{i=1}^{N^*} \frac{\mathcal{V}_w^i Q_{wy}^i a_{wi}}{a_{wi,max} + z}$$

wherein $N^*$ is a total number of attack states, $\alpha_{wi,max}$ is a maximum hazard degree of the node w in an attack state i, $$v_w^j$$

is a risk value of the node w in the attack state i, $$Q_{wy}^i$$

is a probability that a node y is in the attack state i after attack by the node w, $\alpha_{wi}$ is a hazard degree of the node w in the attack state i, z is an attack constant, and $\mathcal{D}_{wy}$ is a risk expectation that the node w attacks the node y;

constructing a directed weighted network according to directional risk factors and calculating an average probability of path-compromised nodes:

$$\bar{\mathcal{q}}_w = \sum_{\ell=1}^{n} \frac{Q_{w\ell}}{n}$$

wherein $n$ is the number of other nodes compromised from the node w, $\ell$ is a path for compromising other nodes from the node w, $\bar{\mathcal{q}}_w$ is an average probability of compromising other nodes from the node w, and $Q_{w\ell}$ is a probability of compromising other nodes from the mode w through a $\ell^{th}$ path;

calculating an average probability of being compromised:

$$\bar{\mathcal{P}}_w = \sum_{\ell_w}^{n_1} \frac{\mathcal{K}_{\ell_w}}{n_1}$$

wherein $\mathcal{K}_{\ell_w}$ is a probability of compromising the node w through the $\ell^{th}$ path, $n_1$ is the number of possible paths where the node w is compromised, and $\bar{\mathcal{P}}_w$ is an average probability of compromising the node i;

constructing a weighted directed graph based on the directed weighted network and calculating an importance index of node:

$$\mathcal{E}_w = \vartheta_1\left(e^{log_{10}(1+S_{ot}(w))} + e^{log_{10}(1+S_{in}(w))}\right)\log_{10}(1 + S_{ot}(w)) +$$

$$\vartheta_2 \log_{10}[(1 + S_{in}(w))(1 + e^{-\upsilon \hat{r}_w})]^{\frac{1}{3}}$$

wherein $\mathcal{E}_w$ is an importance index of the node w, $\vartheta_1$ is a first balance factor, $\vartheta_2$ is a second balance factor, e is a natural constant, $S_{ot}(w)$ is a weight of the node w in sending connections, $S_{in}(w)$ is a weight of the node w in receiving connections, and $\upsilon$ is a compromise coefficient;

calculating a weighted risk expectation of node:

$$\mathcal{A}_w = \lambda \sum_{i=1}^{N^*} \frac{v_w^i R_w^i a_{iw}}{a_{iw,max} + z}$$

wherein $\mathcal{A}_w$ is a weighted risk expectation of the node w $$R_w^i$$

is a probability that the node w is in the attack state i, $\lambda$ is a weighting factor, and a risk value of the node is calculated as follows:

$$\mathcal{T}_w = \begin{cases} \frac{\varphi_1 \mathcal{A}_w + \varphi_2 \mathcal{E}_w}{|\mathcal{A}_w| + |\mathcal{E}_w|}, & \mathcal{A}_w > 0 \\ 0, & \mathcal{A}_w = 0 \end{cases}$$

wherein $\varphi_1$ is a first balance coefficient, $\varphi_2$ is a second balance coefficient, and $\mathcal{T}_w$ is a risk value of the node w;

in the memory, adjusting the risk value according to the monitoring data to determine a risk degree, comprising:

calculating risk significance of monitoring data:

$$\hbar_j = \frac{\ln\left[\sum_{j=1}^k \mathcal{U}_j |\mathcal{H}_j - \mathcal{S}_{i,bf}| + \chi_j\right]}{|\mathcal{S}_{i,bf}|}$$

wherein $\hbar_j$ is risk significance of $j^{th}$ monitoring data, k is a total number of the $j^{th}$ monitoring data, $\mathcal{U}_j$ is a contribution degree of the $j^{th}$ monitoring data, $\mathcal{H}_j$ is a risk tolerance of the $j^{th}$ monitoring data, $\mathcal{S}_{i,bf}$ is a risk damage degree caused by a previous rainfall scenario indicated in the $j^{th}$ monitoring data, and $\chi_j$ is an intensity factor of the $j^{th}$ monitoring data;

integrating monitoring data with risk significance of greater than 0.362 into risk data, and calculating a risk degree according to the risk data:

$$U_c = \frac{1}{k} e^{-\ln\left(\sum_{j=1}^k \hbar_{cj} |f_{cj} - f_j^*| + \zeta_c\right)} \mathcal{T}_c$$

wherein $U_c$ is a risk degree of a $c^{th}$ rainfall scenario, $f_{cj}$ is a value of $j^{th}$ risk data of the $c^{th}$ rainfall scenario, $f_j^*$ is a standard value of the $j^{th}$ risk data, $\hbar_{cj}$ is risk significance of the $j^{th}$ risk data of the $c^{th}$ rainfall scenario, $\zeta_c$ is an optimization factor of the $c^{th}$ rainfall scenario, k is a total number of the $j^{th}$ risk data of the $c^{th}$ rainfall scenario, and $\mathcal{T}_c$ is a risk value of the $c^{th}$ rainfall scenario;

in the memory, constructing an auxiliary decision-making model for waterlogging risk disposal according to the risk degree to optimize the auxiliary decision-making for waterlogging risk disposal, comprising:

taking the risk degree as a criterion of decision-making through the auxiliary decision-making model for waterlogging risk disposal:

when the risk degree is less than 0.29, the risk level is classified as Level 1; when the risk degree is greater than 0.29 but less than 0.53, the risk level is classified as Level 2; when the risk degree is greater than 0.53 but less than 0.71, the risk level is classified as Level 3; when the risk degree is greater than 0.71 but less than 0.89, the risk level is classified as Level 4; and when the risk degree is greater than 0.89 but less than 1, the risk level is classified as a special level;

the auxiliary decision-making model for waterlogging risk disposal includes an association rule mining algorithm, a Bayesian network algorithm, a long short-term memory network algorithm, and a fuzzy evaluation algorithm;

the association rule mining algorithm selects critical data based on correlation of waterlogging data;

the Bayesian network algorithm constructs a basic Bayesian network structure according to the critical data; risk factors are defined as nodes of the Bayesian network; a probability value is assigned to the state of each node; and general risk factor nodes, decision-making nodes and utility nodes are configured to obtain a first risk degree;

the long short-term memory network algorithm predicts a second risk degree according to temporal characteristics of the critical data; and the fuzzy evaluation algorithm fuses the first risk degree and the second risk degree to obtain a risk degree.

2. The auxiliary decision-making method for urban subway waterlogging risk disposal based on a Bayesian network according to claim 1, wherein a method for predicting a water flow rate based on the monitoring data and the meteorological data comprises inputting the monitoring data and the meteorological data into a water flow prediction model to obtain a predicted rate of water flow entering the subway, wherein the water flow prediction model is constructed by using an autoregressive algorithm and a long-short term memory neural network algorithm.

3. The auxiliary decision-making method for urban subway waterlogging risk disposal based on a Bayesian network according to claim 1, wherein a method for predicting an available water discharge volume based on the basic data and the monitoring data comprises:

using a drainage setting from the basic data as a reference standard to obtain a difference between an initial water volume of a drainage channel and a terminal water volume of the drainage channel from the monitoring data;

when the initial water volume of the drainage channel indicated in the monitoring data is greater than or equal to the reference standard, and when the difference is less than 10%, taking the reference standard of the channel as a water discharge volume of the current drainage pipe, otherwise taking the terminal water volume of the drainage channel as a water discharge volume of the current drainage pipe; and when the initial water volume of the drainage channel indicated in the monitoring data is lower than the reference standard, and when the difference is less than 13.1%, taking the reference standard of the channel as a water discharge volume of the current drainage pipe; when the difference is between 13.1% and 100%, taking the reference standard of the channel minus the difference as a water discharge volume of the current drainage pipe; and when the difference is 100%, taking 0 as a water discharge volume of the current drainage pipe.

4. The auxiliary decision-making method for urban subway waterlogging risk disposal based on a Bayesian network according to claim 1, wherein a method for optimizing the auxiliary decision-making for waterlogging risk disposal comprises:

randomly generating a plurality of search agents and calculating positions of the search agents:

$$\hat{u}_{a,s} = \mathcal{U}_{a,s} + \frac{r}{r+1}[\mathcal{U}_{p,s} - (1+r)\mathcal{U}_{a,s}] + \text{sign}(\hat{C}_a - \hat{C}_p)$$

wherein $\hat{u}_{a,s}$ represents an updated position of an $a^{th}$ search agent in an $s^{th}$ dimension, $\mathcal{U}_{a,s}$ represents a position of the $a^{th}$ search agent in the $s^{th}$ dimension, $r$ is a random number, sign(•) is a sign function, $C_a$ is an objective function value of the $a^{th}$ search agent, $\mathcal{U}_{p,s}$ represents a position of a $p^{th}$ search agent in the $s^{th}$ dimension, and $C_p$ is an objective function value of the $p^{th}$ search agent;

calculating an updated position and mutation individual of search agent:

$$\mathcal{U}_1 = \begin{cases} \hat{u}_{a,s}, & \hat{C}_a < \hat{C}_a \\ \mathcal{U}_a, & \text{others} \end{cases}$$

$$\mathcal{G}_{a,t} = \mathcal{U}_{r_1,t} + rd(\mathcal{U}_{r_2,t} - \mathcal{U}_{r_3,t}) + rd(\mathcal{U}_{r_4,t} - \mathcal{U}_{r_5,t})$$

wherein $\hat{C}_a$ represents an updated objective function value of the $a^{th}$ search agent, $\mathcal{U}_1$ represents a position of the search agent after first-stage update, random numbers are $r_1, r_2, r_3, r_4$ and $r_5$ respectively, rd(•) is a random number function, random individuals of a population during a $t^{th}$ iteration are denoted as $\mathcal{U}_{r_1,t}$, $\mathcal{U}_{r_2,t}$, $\mathcal{U}_{r_3,t}$, $\mathcal{U}_{r_4,t}$ and $\mathcal{U}_{r_5,t}$ respectively, and a mutation individual of the $a^{th}$ search agent of a population during the $t^{th}$ iteration is denoted as $\mathcal{G}_{a,t}$;

calculating a position of a moving search agent:

$$\mathcal{U}^*_{a,s} = \mathcal{U}_{a,s} + \frac{r}{r+1}[\eta(\mathcal{U}_{b,s} - \mathcal{U}_{v,s}) + (1-\eta)(\mathcal{U}_{b,s} - 2\mathcal{U}_{v,s})] \cdot \text{sign}(\hat{C}_1 - \hat{C}_\kappa)$$

wherein $\mathcal{U}^*_{a,s}$ represents a position of the $a^{th}$ search agent moving in the $s^{th}$ dimension, $\mathcal{U}_{b,s}$ represents a position of a $b^{th}$ search agent moving in the $s^{th}$ dimension, $\mathcal{U}_{v,s}$ represents a position of a $v^{th}$ search agent in the $s^{th}$ dimension, $C_1$ is an objective function value of a $1^{st}$ search agent, and an objective function value of a $\kappa^{th}$ search agent is $C_\kappa$;

calculating a scaling factor:

$$\eta_t = \eta_{min} + \frac{\eta_{max} - \eta_{min}}{1 + e^{-\beta\left(\frac{t_{max}-t}{t_{max}}-H\right)}}$$

wherein $\eta_t$ is a scaling factor of the $t^{th}$ iteration, $\eta_{max}$ is a maximum value of the scaling factor, $\eta_{min}$ is a minimum value of the scaling factor, $\beta$ is a control parameter, $t_{max}$ is a maximum number of iterations, H is a maximum linear coefficient, and a post-attack position of search agent is calculated as follows:

$$\mathcal{U}_2 = \begin{cases} u^*_{a,s}, & C^*_a < C \\ \mathcal{U}_a, & \text{others} \end{cases}$$

wherein $\mathcal{U}_2$ represents a position of the search agent after second-stage update, $C^*_a$ is an objective function value of the $a^{th}$ search agent moving, $C$ is an objective function value, and an updated mutation individual is calculated as follows:

$$\hat{\mathcal{G}}_{a,t_{max}} = \mathcal{U}_{r_6,t_{max}} + \chi(\mathcal{U}_{r_7,t_{max}} - \mathcal{U}_{r_8,t_{max}})$$

wherein random numbers are $r_6$, $r_7$ and $r_7$ respectively, $\hat{\mathcal{G}}_{a,t_{max}}$ represents an updated mutation individual of the $a^{th}$ search agent at the maximum number of iterations, $\mathcal{U}_{r_6,t_{max}}$ represents a position of search agent corresponding to the random number $r_6$ and the maximum number of iterations, $\mathcal{U}_{r_7,t_{max}}$ represents a position of search agent corresponding to the random number $r_7$ and the maximum number of iterations, $\mathcal{U}_{r_8,t_{max}}$ represents a position of search agent corresponding to the random number $r_8$ and the maximum number of iterations, and $\chi$ is a mutation coefficient.

* * * * *